March 24, 1970    G. L. ALSPAUGH ET AL    3,502,358

ADJUSTABLE POST ASSEMBLY

Filed May 17, 1968

*INVENTOR.*
GUY L. ALSPAUGH
HARRY W. MITCHELL
BY
*Woodard, Weikart, Emhardt & Naughton*
ATTORNEYS

United States Patent Office 3,502,358
Patented Mar. 24, 1970

3,502,358
ADJUSTABLE POST ASSEMBLY
Guy L. Alspaugh and Harry W. Mitchell, Claypool, Ind.,
assignors to Claypool Aluminum Products, Incorporated, Claypool, Ind., a corporation of Indiana
Filed May 17, 1968, Ser. No. 730,041
Int. Cl. E04g 25/08
U.S. Cl. 287—58                                4 Claims

ABSTRACT OF THE DISCLOSURE

A post freely slidable vertically in a first sleeve coaxial therewith, and a second sleeve received on the first sleeve and coaxial therewith and having a conical internal clutch surface. A plurality of clutch balls received in locating apertures of the first sleeve and operable by gravity to permit upward post movement only. A lower collar on the post engageable with the first sleeve upon upward post movement to release the clutch, and an upper collar or seat on the post engageable with the upper end of the first sleeve near a lower limit of downward post movement to reestablish the one-way clutch action on the post.

BACKGROUND OF THE INVENTION

Field of the invention

This invention relates generally to extendable posts and position locking and release means therefor.

Description of the prior art

The prior art includes a variety of post locating and locking and release structures. Examples of United States patents disclosing such structures are as follows: 2,838,-266, Rees, June 10, 1958; 2,961,260, Newlin, Nov. 22, 1960; 3,008,742, Goldstein, Nov. 14, 1961.

The devices disclosed in the foregoing patents are intended for various uses, and vary somewhat in construction although they all use some variation of a one-way ball clutch structure. While the devices are more or less straightforward in operation, and in a sense they might be considered fairly simple, they are somewhat more complex to manufacture and assemble, and involve more costs than is desired in mass-produced low-cost products. The present invention is directed toward overcoming one or more of these shortcomings of such prior art structures.

SUMMARY

Described briefly, in a typical embodiment of the present invention a tubular post is provided with a release sleeve and a clutch sleeve coaxial therewith and serving as a guide therefor. The release sleeve is provided with a circle of apertures receiving clutch balls engageable simultaneously with the post and a conical clutch surface in the clutch sleeve to permit one-way movement only of the post in the sleeves. Abutments are provided on the post and engageable alternately with the release sleeve to move the release sleeve to either a clutch disabling condition or a clutch enabling condition for height adjustment of the post.

DESCRIPTION OF THE PREFERRED EMBODIMENT

Figure 1:
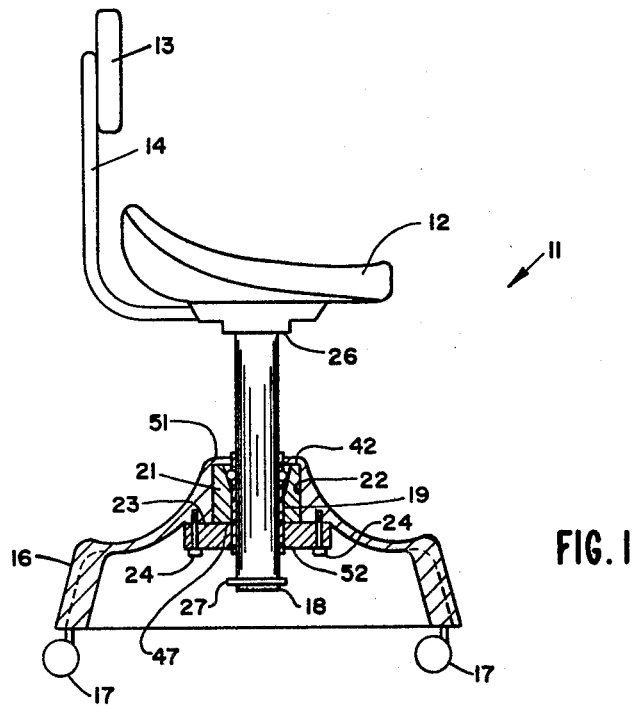
FIGURE 1 is an elevational view of a chair or stool with the base shown in section to illustrate a typical embodiment of the present invention incorporated therein.

Referring now to the drawings in detail, the chair 11 is provided with a seat 12, back 13 and back support 14 secured to the seat. A base 16 which may be molded or otherwise formed is mounted on a plurality of casters 17 and supports the post assembly including a tubular post 18, a release sleeve 19, and a clutch sleeve 21, the latter being fittingly received in a cylindrical pocket 22 in the base and retained in position by support block 23 secured to the base by screws 24. The seat 12 is affixed to the upper end of the post and the lower face 26 of the seat serves as an upper abutment for a purpose which will be described. A retainer ring 27 received in a groove near the lower end of the post serves as a lower abutment.

Figure 2:
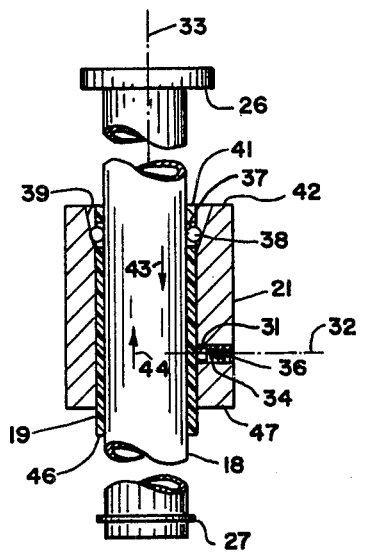
FIGURE 2 is an enlarged sectional view illustrating details of the post adjustment structure according to the typical embodiment, with portions of the post being deleted to conserve space in the drawing.

Referring now to FIGURE 2, post 18 is received in the release sleeve 19 with a guiding but sliding fit so that the post can freely slide up and down in the sleeve but is guided while doing so. To aid in this function and for simplicity and economy of construction, the post may be aluminum and the sleeve nylon. Release sleeve 19 is fittingly received in the clutch sleeve 21 so that the release sleeve is also vertically slidable in the clutch sleeve, again implementing the guiding function served by the release sleeve but the fit can be closer so the release sleeve is not as freely slidable. However, if for some reason it is desired to have a comparatively free sliding fit on the release sleeve in the clutch sleeve, the objectives can still be obtained by providing a friction button 31 in a cylindrical transverse aperture in the clutch sleeve, the aperture having its cylindrical axis 32 normal to and intersecting the post axis 33. This button is spring-loaded by the spring 34 and a setscrew 36 threadedly received in the aperture in the clutch sleeve. The purpose of this will be apparent as the description proceeds.

A circle of circularly spaced apertures 37 is provided in the release sleeve near the upper end thereof and receives a plurality of clutch balls 8. These are disposed between the post and the conical inner surface 39 of the clutch sleeve, this surface serving as a clutch surface. With the release sleeve disposed as shown in FIGURE 2, the balls 38 can simultaneously engage both the cylindrical surface of the post and the conical clutch surface, and the clutch thereby provided is enabled to prevent relative movement of the post downward in the direction of arrow 43 with respect to the clutch sleeve. However, upward movement of the post in the direction of arrow 44 is easily accomplished because it tends to release the clutch balls. Accordingly, anything mounted to the top of the post can be located and held at a desired level. In the example of FIGURE 1 it is a seat such as might be used by a dentist or a barber while serving a patient or customer.

Disregarding FIGURE 1 for a moment, note that in FIGURE 2 the upper end 41 of the release sleeve is shown to be coplanar with the upper end 42 of the clutch sleeve, and the lower end 46 of the release sleeve projects somewhat below the lower end 47 of the clutch sleeve. With the parts thus disposed, the retainer ring or collar 27 received in a groove near the lower end of the post will engage the lower end 46 of the release sleeve near the limit of upward travel of the post 44 with respect to the clutch sleeve. As the post is moved still further upward, the retainer or stop collar 27 will eventually engage the lower end 47 of the clutch sleeve whereupon upward movement of the post stops and it is as high as it will go. During the travel between the time of engagement of collar 27 with end 46, and engagement of the collar with clutch sleeve end 47, the release sleeve is moved upward in the direction of arrow 44. Accordingly the apertures 37 therein move the balls 38 upwardly so that it becomes impossible for them to engage both the post and the clutch surface simultaneously. Consequently they cannot then prevent downward movement of the post with respect to the sleeves. Accordingly the post can be freely lowered.

As the release sleeve was moved upward by collar 27, the upper end thereof 41 began to project above the plane of the upper face 42 of the clutch sleeve. Consequently, as the post is then freely lowered after release of the clutch, the upper end of the release sleeve is in position to be engaged by the upper collar 26 on the post. Further downward movment of the post in the sleeves will serve to move the release sleeve downward and again restore it to position where the clutch balls again become engageable simultaneously with both the post and the clutch surface to stop descent of the post. Accordingly the seat or whatever else might be mounted atop the post can again be elevated in an infinite number of steps from its lowermost position to its uppermost possible position.

In order to keep the clutch in the disabled condition after raising the post to its upper limit and until it is lowered to its lower limit, the release sleeve should not be permitted to slide downward at all along with the post until it is engaged by the collar 26. In order to avoid the downward sliding, the release sleeve can either be a snug friction fit with the clutch sleeve or a comparatively freely sliding fit with the clutch sleeve, but controlled by the friction button 31. This button can be adjusted so that the release sleeve will not slide downwardly with the post until engaged by the collar 26. Similarly the release sleeve should not slide upwardly with the post as the post is raised to a desired level. The friction button also serves this purpose.

Again referring to FIGURE 1, note that the upper end 42 of the clutch sleeve is below the upper end 51 of the base. Similarly the lower end 47 of the clutch sleeve is above the lower face 52 of the support block 23. If the proper action of the release sleeve is to be accomplished in this structure, the collar 27 must be of a diameter sufficiently small to enable it to pass up through block 23 to engagement with the lower face 47 of the clutch sleeve. Similarly the collar 26 must be of sufficiently small diameter to pass downwardly by the upper face 51 of the base to engage the release sleeve and the upper end 42 of the clutch sleeve. This can be readily accomplished by appropriate sizing of the apertures in the block 23 and the upper end of the base 16. As an alternative, however, and as shown in FIGURE 1, the release sleeve can be made axially long enough to project above the plane of the upper face 51 of the base and below the plane of the lower face 52 of the support block 23. In this event, the collar 27 can engage the lower end of the release sleeve and abut the lower face 52 of the support block for a stop. Similarly the collar 26 can engage the upper end of the release sleeve to re-engage the clutch balls and be stopped by the upper face 51 of the base.

From the foregoing description, it can be appreciated that the provision of the collars above and below the release sleeve on the post facilitate the activation and disablement, respectively, of the clutch regardless of the environment in which the assembly is to be employed. The only modification which might be needed, depending upon what is deemed most suitable, might be the overall length of the release sleeve.

The free sliding fit of the post 18 in the release sleeve 19 not only enables movement of the post up and down as described above, but also permits free rotation of the post either clockwise or counter-clockwise regardless of what height setting is selected for the post. To further facilitate such rotation, the clutch balls 38 cooperating with the post 18 and surface 39 serve not only as a clutch but also as ball bearings, sustaining radial and downward thrust loading.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:
1. An adjustable post assembly comprising:
an inner post;
first sleeve means encircling a portion of said post and coaxial therewith;
second sleeve means encircling a portion of said first sleeve means and coaxial therewith;
a clutch surface on said second sleeve means;
a clutch member disposed between said post and said second sleeve means, said member being simultaneously engageable with said post and said clutch surface to prevent relative axial movement of said post with respect to said second sleeve means in one direction,
said first sleeve means having locator means therein engageable with said clutch member, said first sleeve means being movable with respect to said second sleeve means to a position locating said clutch member in position precluding simultaneous engagement thereof with both said post and said clutch surface to then facilitate relative axial movement between said post and said second sleeve means in both said one direction and the opposite direction,
clutch disabling means on said post and engageable with said first sleeve,
said disabling means including a first abutment facing a first end of said first sleeve means,
clutch enabling means on said post and including a second abutment facing a second end of said first sleeve means opposite said first end,
said clutch surface of said second sleeve means converging toward said second abutment,
said first end of said first sleeve means being engageable by said first abutment and movable thereby toward said clutch surface upon movement of said post to a point near a limit of post travel in a second direction opposite said one direction, for disabling simultaneous engagement of said clutch member with said post and said clutch surface to then permit free travel of said post in said one direction to a second point near an opposite limit of post travel,
said second end of said first sleeve means being engageable by said second abutment and movable thereby in said one direction upon movement of said post to said second point to reinstate the simultaneously engageable relationship between said clutch member and said post and then permit free travel of said post in said second direction only,
said post being disposed substantially vertically, and said first abutment being a stop ring secured to said post near the bottom thereof, and said second abutment being a lower margin of a seat unit secured to said post near the top thereof,
said second sleeve means having stop means on the lower and upper ends thereof engageable by said stop ring and said seat unit margin respectively, to limit upward and downward travel of said seat unit,
the axial length of said first sleeve means exceeding that of said second sleeve means so that at least one of said ends of said first sleeve means extends beyond a corresponding end of said second sleeve means.
2. An adjustable post assembly comprising:
an inner post;
first sleeve means encircling a portion of said post and coaxial therewith;
second sleeve means encircling a portion of said first sleeve means and coaxial therewith;
a clutch surface on said second sleeve means;
a clutch member disposed between said post and said second sleeve means, said member being simultaneously engageable with said post and said clutch sur- face to prevent relative axial movement of said post with respect to said second sleeve means in one direction, said first sleeve means having locator means therein engageable with said clutch member, said first sleeve means being movable with respect to said second sleeve means to a position locating said clutch member in position precluding simultaneous engagement thereof with both said post and said clutch surface to then facilitate relative axial movement between said post and said second sleeve means in both said one direction and the opposite direction, clutch disabling means on said post and engageable with said first sleeve, said disabling means including a first abutment facing a first end of said first sleeve means, clutch enabling means on said post and including a second abutment facing a second end of said first sleeve means opposite said first end, said clutch surface of said second sleeve means converging toward said second abutment, said first end of said first sleeve means being engageable by said first abutment and movable thereby toward said clutch surface upon movement of said post to a point near a limit of post travel in a second direction opposite said one direction, for disabling simultaneous engagement of said clutch member with said post and said clutch surface to then permit free travel of said post in said one direction to a second point near an opposite limit of post travel, said second end of said first sleeve means being engageable by said second abutment and movable thereby in said one direction upon movement of said post to said second point to reinstate the simultaneously engageable relationship between said clutch member and said post and then permit free travel of said post in said second direction only, and a plurality of clutch members like said clutch member and disposed in a circle around said post;

said first sleeve means including a nylon tube, said second sleeve means being affixed in the base of a chair, said tube projecting above the base of said chair when said clutch members are disabled from simultaneous engagement with said post and said clutch surface for engagement and movement downwardly by said seat unit to a position enabling clutch engagement.

3. An adjustable post assembly comprising:
a first post;
a first sleeve encircling a portion of said first post and coaxial therewith;
a second sleeve encircling a portion of said first sleeve and coaxial therewith;
a clutch surface on said second sleeve;
a clutch member disposed between said post and said second sleeve, said member being simultaneously engageable with said post and said clutch surface to prevent relative axial movement of said post with respect to said second sleeve in one direction, said first sleeve having location means therein engageable with said clutch member, said first sleeve being movable with respect to said second sleeve to a position locating said clutch member in position precluding simultaneous engagement thereof with both said post and said clutch surface to then facilitate relative axial movement between said post and said second sleeve in both said one direction and the opposite direction, said post having a freely sliding fit in said first sleeve, and said first sleeve having a sliding fit in said second sleeve, such that said first sleeve normally remains in a given axial position with respect to said second sleeve in spite of relative sliding movement between said post and said first sleeve, friction means cooperating with said first and second sleeve to establish resistance to sliding motion of said first sleeve with respect to said second sleeve, said friction means including a friction member disposed in said second sleeve and adjustable to establish a desired amount of resistance to sliding of said first sleeve with respect to said second sleeve.

4. The combination of claim 3 wherein:
said friction means include a friction member in said second sleeve and a setscrew threadedly received and adjustable in said second sleeve, with a spring between said friction member and said setscrew and urging said friction member against said first sleeve.

References Cited

UNITED STATES PATENTS

| 1,031,637 | 7/1912  | Fischer.               |
| 1,194,551 | 8/1916  | Schossler.             |
| 2,010,292 | 8/1935  | Campbell.              |
| 2,388,056 | 10/1945 | Hendricks.             |
| 2,658,777 | 11/1953 | Rauglas.               |
| 2,850,077 | 9/1958  | Dawson ____ 248—414 XR |
| 2,961,260 | 11/1960 | Newlin.                |

D. J. WILLIAMOWSKY, Primary Examiner

A. V. KUNDRAT, Assistant Examiner

U.S. Cl. X.R.

74—531; 188—67; 248—412